United States Patent [19]
Pickrell et al.

[11] 4,138,130
[45] Feb. 6, 1979

[54] SHIELD ASSEMBLY FOR TOWED TRAILER
[76] Inventors: James M. Pickrell, Rt. 3, Box 1129; Floyd V. Pate, 709 Placer, both of Odessa, Tex. 79763
[21] Appl. No.: 836,397
[22] Filed: Sep. 26, 1977
[51] Int. Cl.² ............................................. B62D 25/16
[52] U.S. Cl. ............................... 280/154.5 R; 296/1 S
[58] Field of Search ................ 180/68 P; 280/154.5 R; 296/1 S, 91

[56] References Cited
U.S. PATENT DOCUMENTS

| 3,899,193 | 8/1975 | Evans | 280/154.5 X |
| 4,007,944 | 2/1977 | Dingess | 280/154.5 R |

Primary Examiner—Richard A. Bertsch
Attorney, Agent, or Firm—Marcus L. Bates

[57] ABSTRACT

A shield assembly for a travel trailer towed behind a prime mover for preventing road debris from the towing vehicle from striking the front wall of the towed trailer. The assembly includes a pair of brackets attached to the opposed conveying legs which form the forward A-frame of the trailer, together with a pair of shields which are removably received by the brackets. The shields and brackets are mirror images of one another and orientated respective to the A-frame to cause the shields to extend in spaced parallel relationship respective to the front wall of the trailer.

5 Claims, 7 Drawing Figures

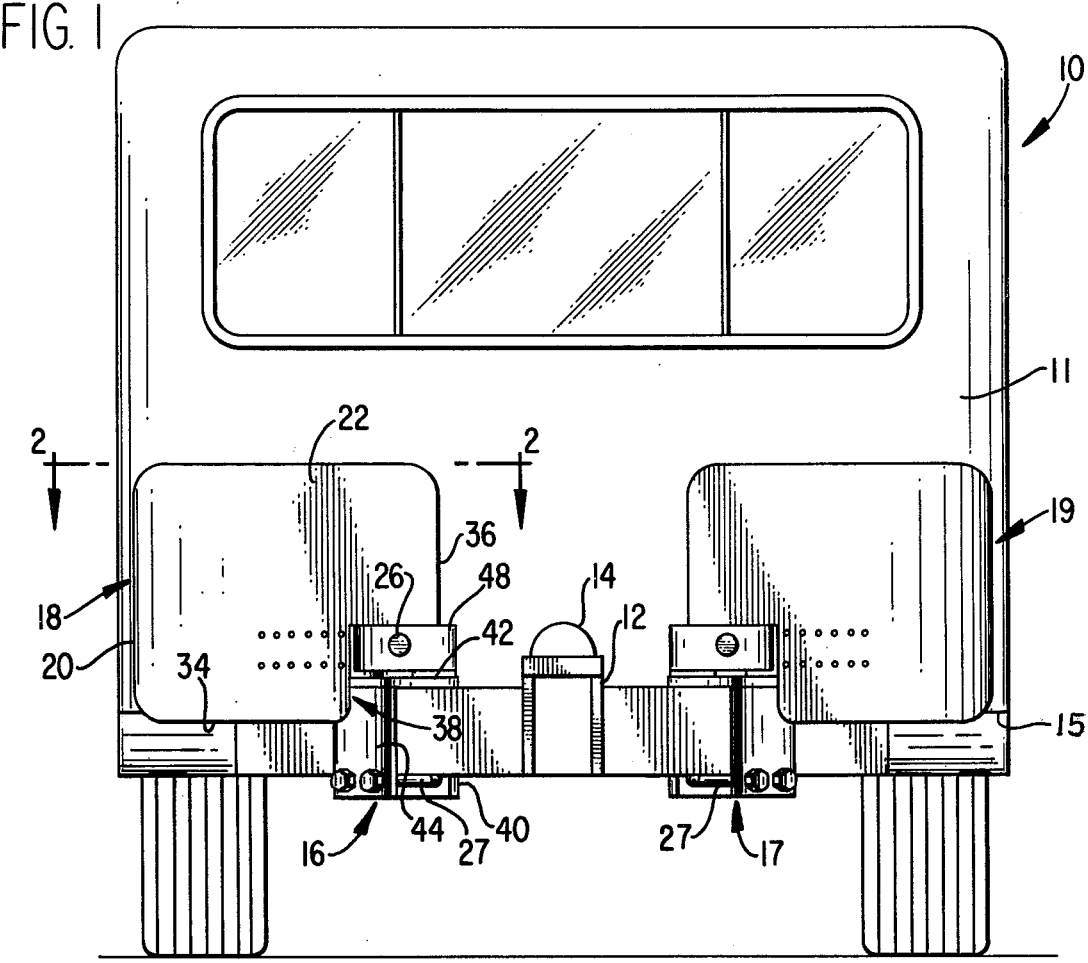
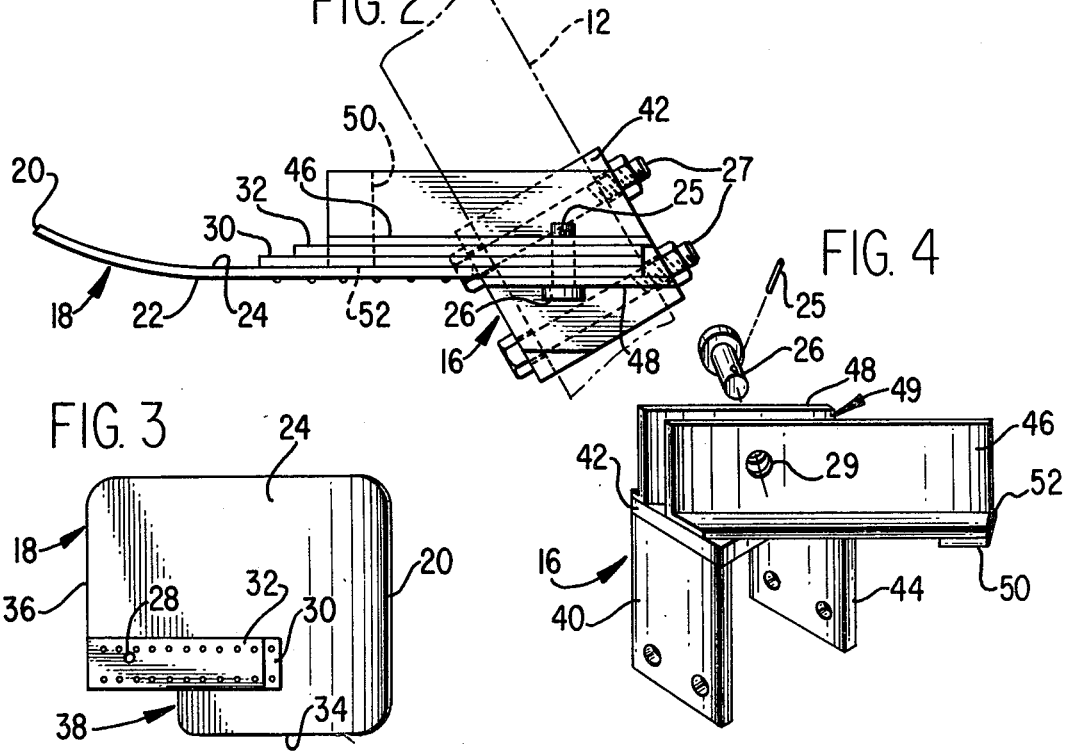

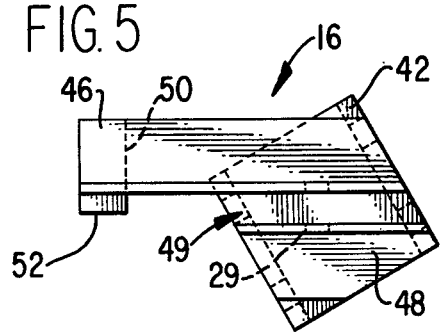
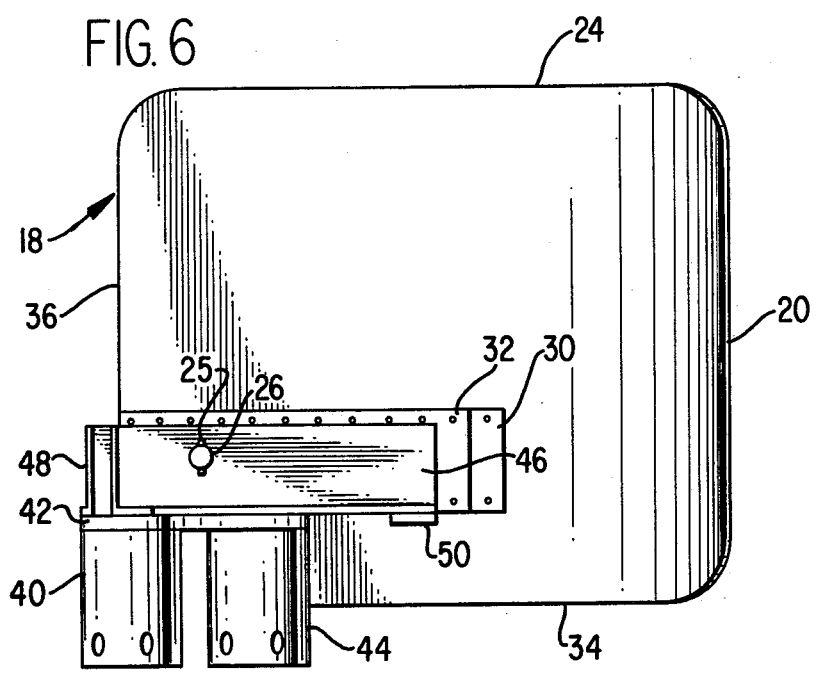
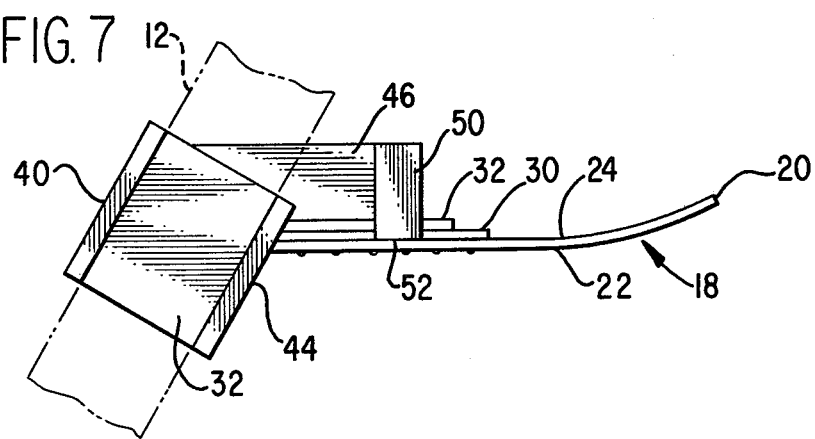

SHIELD ASSEMBLY FOR TOWED TRAILER

BACKGROUND OF THE INVENTION

Modern trailers of the type which are towed by automotive type vehicles are generally made in a streamline configuration and with sufficient structural integrity to enable them to be towed at maximum permissible highway speed. The towing vehicle continually causes road debris to enter the air and travel directly toward the front wall of the trailer with great velocity where the debris impact against the forward wall surface with considerable energy. The road debris include sand, gravel, rocks, and other similar material which continually abraids the front wall and eventually causes substantial damage thereto.

Furthermore, many people take great pride in preserving the beauty and craftsmanship of their travel trailer and find themselves spending an inordinate amount of time during the evening washing road grime and other foreign material from the front wall surfaces thereof. This is an unpleasant task because the foreign material being washed from the wall potentially represents every conceivable form of refuge and is therefore unhealthy, unsightly, and repulsive to everyone involved. Accordingly, it would be desirable to be able to prevent road debris from marring the external surface of the forward wall of a travel trailer or the like.

RELATED PRIOR ART

Blenderman U.S. Pat. Nos. 2,146,167; Mitterdorf 3,815,700; Mitterdorf 3,863,728; Mitterdorf 3,987,863; Killen 3,463,508; Fowler 1,410,399; Sullivan 3,058,757.

The present invention differs from the above cited art of record in that there has heretofore never been taught the use of a removable shield for attachment to a bracket mounted to the frame of a towed trailer in such a manner to be interposed between the trailer front wall and the wheels of the towing vehicle.

SUMMARY OF THE INVENTION

This invention relates to a shield assembly which is mounted to the A-frame by which a trailer is towed, and includes a plate-like member placed parallel to a lower outer portion of the front wall of the trailer to thereby prevent road debris thrown up from the rear wheels from striking the front wall of the trailer.

The shield assembly includes a bracket for each leg of the A-frame, with the plate member and bracket assembly located on one side of the trailer being a mirrow image of the plate member and bracket assembly located on the opposed side of the trailer.

Each bracket includes means by which it is affixed to the leg or main member which forms one side of the A-frame, and further includes spaced guide means which receives the plate member in sandwiched relationship therebetween. One of the guide members extend in an outward direction and the marginal free end thereof supportingly engages a reinforcement provided on the rear wall of the plate member.

The plate member, bracket, A-frame, and forward end wall of the trailer are arranged respective to one another so that the plate member is positioned at a location which is substantially parallel to the front trailer wall and is located in the path of any air borne debris emitted by the rear wheels of the towing vehicle.

Accordingly, the primary objection of the present invention is the provision of a shield apparatus which prevents road debris from marring the front wall of a towed trailer.

A further object of this invention is the provision of a shield device which can be detachably mounted forwardly of a trailer to be towed.

Still another object of this invention is the provision of a plate member removably affixed to a trailer frame in spaced relation to a front wall thereof for protecting the front wall from debris.

Still another object of this invention is the provision of a shield means removably affixed in advanced of a trailer front wall for intercepting road debris and enhancing the appearance of the towed trailer.

The above objects are attained in accordance with the present invention by the provision of a combination of elements which are fabricated in a manner substantially as described in the above abstract and summary.

These and various other objects and advantages of the invention will become readily apparent to those skilled in the art upon reading the following detailed description and claims and by referring to the accompanying drawings.

BRIEF DESCRIPTION OF THE DRAWINGS

FIG. 1 is a front elevational view of a towed trailer having a shield assembly made in accordance with the present invention operatively associated therewith;

FIG. 2 is an enlarged top view taken along line 2—2 of FIG. 1 showing some additional details of the present invention;

FIG. 3 is a rear elevational view of part of the apparatus disclosed in the foregoing figures;

FIG. 4 is a front elevational view of part of the apparatus disclosed in FIGS. 1 and 2;

FIG. 5 is a top view of the apparatus disclosed in FIG. 4;

FIG. 6 is an enlarged rear view of the shield assembly of the present invention; and, FIG. 7 is a bottom view of the apparatus disclosed in FIG. 6.

DETAIL DESCRIPTION OF THE PREFERRED EMBODIMENT

In FIG. 1 there is disclosed a towed trailer 10 which, for the purpose of this disclosure, is illustrated in the form of a modern travel trailer. The trailer has the usual forwardly positioned A-frame 12 which terminates in an ordinary hitch 14. An automotive type vehicle (not shown) can be provided with a special towing hitch assembly which accommodates the hitch 14 so that the trailer can be safely towed at considerable road speeds.

A shield assembly, made in accordance with the present invention, is mounted on either side of the trailer in the illustrated manner of FIG. 1. The shield assembly includes guard brackets 16 and 17, respectively, mounted to the right and left legs, respectively, of the A-frame. Plate members 18 and 19, respectively, are mounted to the guard brackets 16 and 17, respectively.

It will be noted in FIG. 1 that the plates and brackets are mirrow images of one another and therefore only the details of one of the shield assemblies will be presented with the understanding that the description also applies to the other brackets and plate members.

As illustrated in FIGS. 1 and 2, the plate has an outer end 20 placed slightly inward of the sidewall of the trailer 10. The front 22 and rear 24 of the plate member can be of any desired finish, as for example, polished aluminum or epoxy paint. A fastener means in the form of a pin 26 and keeper 25 removably affixed the plate member in captured relationship within the guard bracket. Aperture 28 is formed through the plate member and through the two superimposed elongated reinforcing members 30 and 32. The lower edge 34 and the innermost edge 36 of the plate members are mutually provided with a cutout 38.

The cutout 38 is formed in immediate underlying relationship respective to the lowermost edge portion of the reinforcement members 30 and 32 thereby providing ample space by which the bracket assembly can be accommodated in such a manner that the plate member overhangs the leg of the A-frame. It is preferred that the lowermost edge portion 34 of the plate member extends slightly below the lowermost edge portion 15 of the front wall of the trailer 10.

As seen in FIG. 4, together with other figures of the drawings, the bracket assembly includes a mount means in the form of an inverted U having an inner leg 40 affixed to a horizontal plate member 42, with an opposed plate member 44 being disposed parallel to member 40. Two spaced parallel members 46 and 48 are affixed to the horizontal plate member 42 and are spaced apart at 49 in an amount which is sufficient to capture the reinforced portion of the shield assembly in slidable relationship therewithin.

Upwardly extending member 46 preferably is about three times as long as the upwardly extending member 48 and therefore forms an inside cantilever brace. The cantilever brace terminates in a pad 50 which extends forwardly at 52 into engagement with the rear side 24 of the plate member. The pad 52 underlies the two reinforcing members 30 and 32 thereby bottom supporting the lower edge of the reinforcement while bearing against a medial rear area thereof.

In operation, the bracket assemblies are bolted to each leg of the A-frame by utilizing the spaced bolts in the manner of FIG. 1. This arrangement avoids welding the heat treated frame member and further avoids weakening the frame as would occur by the placement of bolt holes therethrough. The bracket assembly is positioned forwardly of wall 11 such that only an inch or so of space remains between the plate member and the forward wall surface of the trailer. The plate member is next fitted into place by sliding the inside marginal edge of the reinforcing members into the slot 49 until the apertures 28 and 29 are brought into alignment, and thereafter placing pin 26 through the apertures, thereby locking the plate member to the bracket assembly. The pin 26 may be of the self-locking type thereby dispensing with the necessity of a keeper 25.

With each of the shield assemblies placed at the lower outer extremity of the front wall and interposed in a position between the rear wheels of an automobile (not shown) and the forward wall of the trailer, road debris will now strike the plate members 18 and 19, rather than the forward wall 11 of the trailer.

In the evening when one reaches his destination for the night, the plate members 18 and 19 can be readily removed by merely pulling the pin and lifting the plate members from a bracket. The plate members can be stored under the trailer, if desired, until the following travel day. This expedient disposes a clean and attractive surface 11 to those who are sitting about the exterior of the trailer, and removes the road debris and undesirable material from view, while avoiding the unpleasant task of cleaning the exterior of the trailer.

When it is desired to commence traveling again, the plate members are retrieved and pinned into the illustrated position of FIG. 1 with there being no immediate necessity for scrubbing and washing of the plate members until it is necessary to store the trailer for an extended length of time.

I claim:

1. In a trailer of the type which is towed and which has a forwardly disposed A-frame for attachment to a towing vehicle, the combination with said trailer of a shield assembly by which the forward end wall of the trailer is protected from debris thrown by the towing vehicle;

said shield assembly includes a plate and a bracket assembly for each leg of said A-frame, with the plate and bracket assembly of one leg being a mirrow image of the plate and bracket assembly of the other leg;

each said bracket assembly having downwardly disposed members which are affixed to a leg of said A-frame, and further includes upwardly disposed spaced guide members; said guide members being parallel to one another and to said plate; said plate having a marginal surface thereof received within said guide members, means by which said plate is removably attached to said bracket assembly;

so that said plate, bracket assembly, A-frame, and forward end wall can be arranged respective to one another to dispose said plate parallel to the forward end wall at a location superimposed in advance of a lower marginal outer wall surface thereof and in the path of air borne debris emitted by the rear wheels of the towing vehicle.

2. The combination of claim 1 wherein one of said spaced guide members is a cantilever arm which extends horizontally away from said downwardly disposed members to offer support at another location on said plate.

3. The combination of claim 1 wherein said plate has a cutout formed at the lower inner corner thereof, a horizontally disposed reinforcement affixed to said plate at a location immediately above said cutout and extending at least part of the way across said plate;

one of said spaced guide members is a cantilever arm which extends horizontally away from said downwardly disposed members to offer support to another location on said plate.

4. A shield assembly for attachment to the forward frame of a towed trailer which prevents road debris from striking the forward wall of the trailer;

said shield assembly includes a plate and a bracket; mount means on said bracket for attachment to the frame, and support means on said bracket by which said plate member can be removably supported thereto;

said support means includes spaced guide members between which a marginal edge of said plate is received in captured relationship, a fastener means by which said plate is affixed to said spaced guide members;

one of said guide members is a cantilever arm which extends away from said mount means and into contact with said plate member to offer support on said plate member at a location which is spaced from said mount means;

said bracket and plate being orientated respective to one another so that the bracket can be installed on a trailer with the plate being disposed in spaced parallel relation to a lower outer forward wall thereof.

5. The shield assembly of claim 4 wherein said plate has a cutout formed at the lower inner corner thereof, a horizontally disposed reinforcement affixed to said plate at a location immediately above said cutout and extending at least half the distance across said plate; said cantilever arm extends horizontally away from said guide members to offer support to the other location on said plate.

* * * * *